Sept. 5, 1961  E. C. RAEHRS ET AL  2,998,634
BROACHING TOOL
Filed April 14, 1958
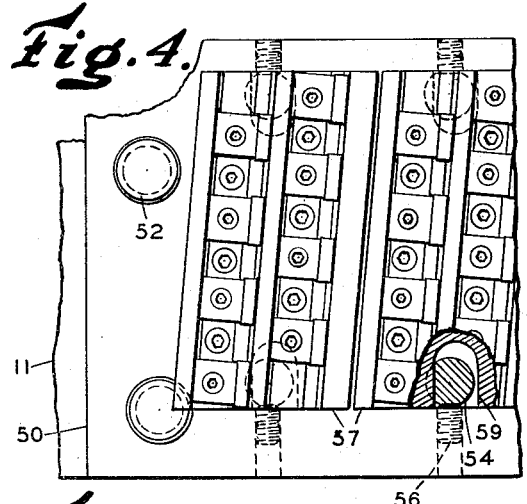
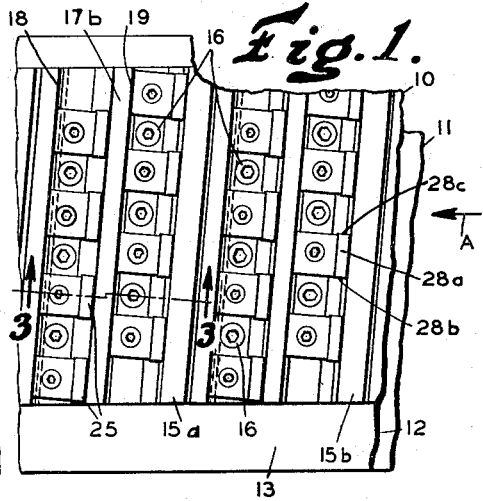
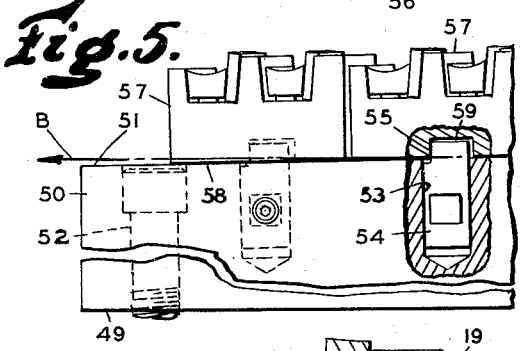
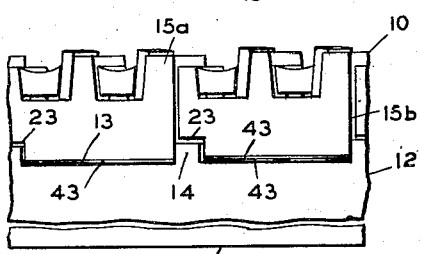
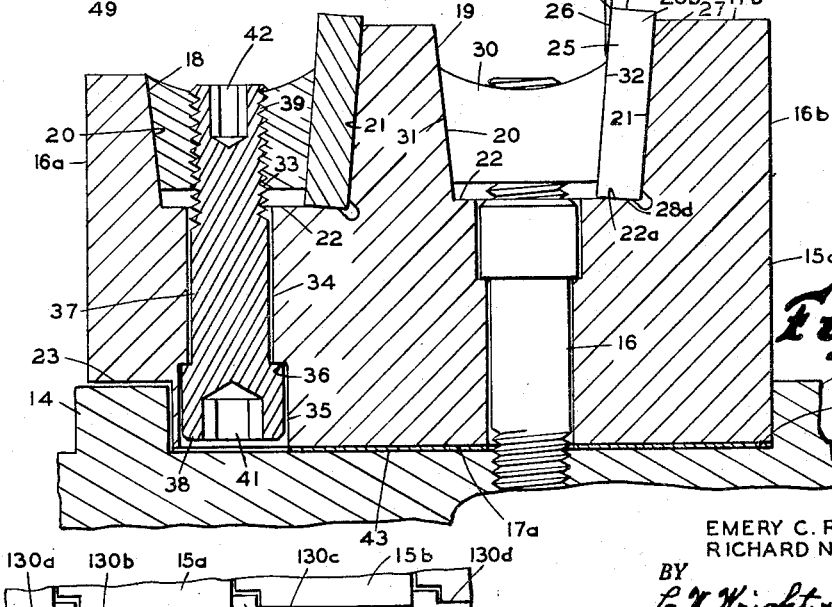
INVENTORS
EMERY C. RAEHRS
RICHARD N. CLIFTON
BY
*L. H. Wright & N. T. Keiser*
ATTORNEYS

United States Patent Office 2,998,634
Patented Sept. 5, 1961

2,998,634
BROACHING TOOL
Emery C. Raehrs and Richard N. Clifton, Cincinnati, Ohio, assignors to The Cincinnati Milling Machine Co., Cincinnati, Ohio, a corporation of Ohio
Filed Apr. 14, 1958, Ser. No. 728,404
4 Claims. (Cl. 29—95.1)

This invention relates to the art of broaching and more particularly to improvements in broaching tools. It is well known in the art of broaching that one pass of the broaching tool is usually sufficient to finish broach a surface. This means that the cutting surface area of the broach tool must be commensurable with the area of the surface to be broached. Since the size of surfaces which are broached is continually increasing the requirements are for larger and heavier broaching machines to handle and move larger broaching tools. If a surface is to be broached in one pass, it is recognized that the width of the broaching tool must be at least equal to the width of the surface, and the length of the broaching tool is a function of the total chip thickness to be removed. This means that the total area of the broaching tool could be very much larger than the area of the surface being broached.

The usual practice is to provide a broaching tool with a large number of individual broaching teeth, each of which has a limited capacity in the amount of chip material that it can remove, and this is known in the art as the chip per tooth. When the surfaces to be broached were small, broaching tools were made in a solid piece but later it was found to be more convenient to provide inserted teeth so that they could be made of more expensive material than the body of the broaching tool, and thus not have to be sharpened so often.

The sharpening and maintenance of large broaching tools with their multitudinous teeth is an expensive one, and the problem is to simplify the sharpening operations and to make it more convenient to repair broaching tools without removing them from the machine when individual cutting teeth become broken to the extent of marring the finish or putting too much of a load on adjacent teeth, i.e., increasing the chip per tooth of the adjacent cutting elements.

One of the objects of this invention is to provide an improved broaching tool having inserted individual cutting teeth or bits which have a plurality of cutting edges so that the bits may be quickly turned and accurately located and clamped to provide a new cutting surface for the broach, without removing the entire tool from the machine.

Another object of this invention is to provide an improved broach in which the cutting teeth are sub-divided into groups, and each group is sub-divided into a plurality of cutting elements or bits whereby at the option of the repairman a single bit may be replaced or an entire group may be replaced while the tool is in situ on the machine.

A further object of this invention is to provide an improved broaching tool in which the individual cutting elements may be quickly and easily clamped or unclamped for maintenance purposes.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

In the drawing:
FIG. 1 is a plan view of a broaching tool constructed in accordance with the present invention;
FIG. 2 is an elevational view of the tool of FIG. 1;
FIG. 3 is a view through section 3—3 of FIG. 1;
FIG. 4 is a plan view of a modified broaching tool constructed in accordance with the present invention;
FIG. 5 is an elevational view of the tool of FIG. 4, and
FIG. 6 is an elevational view of a modified construction of the tool of FIGS. 1 and 2.

The broaching tool of the present invention is indicated generally at 10 in FIG. 1 and is adapted for connection to a member 11 of a broaching machine by bolts (not shown) similar to the bolts 52 of FIG. 4. The member 11, which may, for example, be the ram of the broaching machine, has reciprocating motion in relation to a workpiece (not shown) secured to the broaching machine, said motion consisting of a cutting stroke, in the direction of the arrow A in FIG. 1, and a return stroke. The broaching tool has an elongated body 12 extending longitudinally in the direction of arrow A. The body 12 has a flat inner, or bottom, surface 9 which seats on member 11, and an opposite outer, or top, surface 13 which is parallel to the bottom surface 9. The top, or outer, surface 13 has a plurality of ridges 14 extending transversely to the direction of motion of the member 11, the ridges being at a slight angle from the perpendicular to the path of member 11.

A plurality of identical bit carriers, only two, 15a and 15b, of which are shown, are connected by bolts 16 to the top surface 13 of the body 12 between the ridges 14. Each bit carrier has surfaces 16a and 16b which are designated front and rear, respectively, because of their relationship to the direction of motion of the bit carriers during the cutting stroke (see FIG. 3). The bit carriers also have inner, or bottom, surfaces 17a and outer, or top, surfaces 17b. The front and rear surfaces 16a and 16b of each bit carrier extend parallel to the ridges 14, and the rear surface 16b of each abuts against one of those ridges, which define shoulders to hold the carriers against longitudinal shifting on the body and to locate said carriers in spaced relation longitudinally of the body. The bit carriers 15a and 15b are closely spaced on the body 12 and a recess 23 is cut in the front inner corner of each bit carrier to avoid interference with the ridges 14. Each bit carrier has cut in its outer surface 17b a pair of elongated parallel recesses 18 and 19 extending parallel to the front and rear surfaces of the bit carrier. As shown best in FIG. 3, each recess has a front wall 20, a rear wall 21, and a base 22, the walls being inclined to slope downwardly and inwardly so that the recess is narrower at its base than at the outer surface 17b of the bit carrier. The rear portion of the base 22 is inclined slightly downwardly at 22a to constitute a surface normal to the inclined rear wall 21 of the recess.

A plurality of identical bits 25 are received in the recesses 18 and 19 of each bit holder. The bit 25, which is made of a hard cutting alloy, such as tungsten carbide, has a front square surface 26 which defines the cutting face when the bit is oriented as shown, a rear square surface 27 parallel thereto, and side surfaces 28a, 28b, 28c, and 28d, normal to the front and rear surfaces. The bit 25 is received in the recesses with the rear surface 27 against the inclined rear wall 21 of the recess and the side 28d resting on the surface 22a of the base 22. The inclined wall 21 thus defines a seat for the bit which automatically positions the cutting face 26 of the bit at the desired negative rake angle C. The relative size of the bit and the depth of the recess is such that the side 28a of the bit extends beyond the outer surface 17b of the bit carrier. The edge of the bit 25 where the front surface 26 joins the side 28a thus defines a cutting edge 29, or tooth, for the broaching tool. With the bit inclined at a slight angle from the perpendicular to the direction of motion of the body and bit carrier, the side 28a slopes away from the point where the cutting edge contacts the workpiece during the cutting stroke, and adequate clearance is thereby provided. It will be noted that the conformation of the bit and recess permit rotation of the bit to provide four successive cutting edges where the front surface 26 joins, respectively, the sides 28a, 28b, 28c, and 28d, and also permits reversal of the bit with surface 27 becoming the cutting face to provide four additional cutting edges where the surface 27 joins, respectively, the sides 28a, 28b, 28c, and 28d, for a total of eight cutting edges on each bit.

A clamping block 30 is received in the recesses adjacent each bit 25. The block has an inclined side 31 parallel to the front wall 20 of the recess and an inclined side 32 parallel to the cutting face 26 of the bit. The block is of a size to bear against these surfaces with clearance between the bottom of the block and the base 22 of the recess. The block 30 has a threaded bore 33 extending therethrough, and the recesses 18 and 19 have a plurality of bores 34 in registration with the bores 33 of blocks 30. The bores 34 extend between the base 22 of the recesses and an enlarged opening 35 in the inner surface 17a of the bit carrier, and a shoulder 36 is defined where the bore 34 joins the opening 35. The blocks 30 which clamp the bits in the recesses are secured in the recesses by a bolt 37 having a head 38 engaged with shoulder 36 and a threaded end portion 39 engaged in the threaded bore 33. The bolt has a tool receiving socket 41 in the head and a similar socket 42 in the end 39, which is exposed in the recess, so that the bolt can be turned from either the outer surface or the inner surface of the bit carrier to loosen the bit and permit rotation, reversal, or removal thereof. Thus, each tooth of the broaching tool can individually be renewed or replaced while the broaching tool is locked in the broaching machine.

The bits are locked in the recesses 18 and 19 with the bits in each row being spaced from each other. The bits in recess 19 are in staggered relation to the bits in recess 18 so that together the bits in the two recesses span the carrier and produce a single cut on the workpiece, and the spacing between the bits is such that there is a slight overlap of the bits in the respective recesses so that ridges will not be formed on the surface of the workpiece.

In one construction for producing the desired stepped relationship between the bits, or teeth, of the bit carriers 15a and 15b, shown in FIG. 2, shims are interposed between the inner surfaces 17a of the bit carriers and the outer, or top, surface 13 of the body 12. Shims of different thickness may be used under the respective bit carriers or different numbers of shims of the same thickness may be used. As shown in FIG. 2, bit carrier 15a has a single shim 43 thereunder while bit holder 15b has two shims 43. The difference in the shim thickness between successive bit carriers will define the chip per tooth. It is evident that the chip per tooth of the broaching tool or portions thereof can be quickly and inexpensively changed to accommodate different workpieces.

Another construction for producing the desired stepped relationship between the teeth is shown in FIG. 6. In this construction the top surface 13a of a body 12a has ridges 14a, the area between the ridges being parallel to and at progressively greater height from the bottom surface 9a of the body to define a plurality of steps 130a, 130b, 130c, and 130d separated by the ridges to receive the bit carriers.

In the embodiment of FIGS. 4 and 5, the body 50 has a flat inner or bottom, surface 49, parallel to the direction of motion of the member 11 as indicated by arrow B, which seats on member 11 and an outer, or top, surface 51 which is slightly inclined from the direction of motion of the member 11 and hence is non-parallel to the bottom surface 49. The body 50 is connected to the member 11 by bolts 52. The body has bores 53 cut in its top surface 51 which receive pins 54 having flats 55 at one end thereof. The pins 54 are clamped in the bed by set screws 56 with the flats 55 extending beyond the top surface 51 to define shoulders.

Bit carriers 57 having an inner surface 58 are connected to the body 50. Slots 59 are cut in the inner surface 58 of the bit carriers to receive the pins 54 with the flats 55 of the pins 54 bearing against the front walls of the slots 59. The bit carriers 57 have recesses on their outer surfaces and bits similar to the embodiment of FIGS. 1, 2, and 3. It will be noted that in this embodiment also, the bits and bit carriers may be identical and interchangeable. The chip per tooth is defined by the incline of the outer surface 51 of the body 50 and may be altered by substitution of a body with a different incline. It should be noted that in this embodiment the bits or teeth in the rear recess of each bit carrier will cut slightly deeper than the bits in the front recess, and hence the surface of the workpiece will not be machined to as smooth a finish as is possible with the embodiment of FIGS. 1, 2, and 3 and the embodiment of FIG. 6.

What is claimed is:

1. A broaching tool for machining a surface on a workpiece adapted for connection to a broaching machine for cutting movement relative to the workpiece, the tool comprising an elongated body extending in the cutting direction having a plurality of ridges defining shoulders on the top surface extending transversely to the cutting direction, the areas between the respective ridges on the top surface being at progressively greater elevations to define steps, a bit carrier detachably secured on each of said steps, a plurality of like bits each having cutting edges detachably secured to each bit carrier, the bits being arranged transversely to the cutting direction, and means associated with each carrier to position the cutting edges of the individual bits thereof above the top surface of the carrier to take a single cut on the workpiece.

2. A broaching tool for machining a surface on a workpiece adapted for connection to a broaching machine for cutting movement relative to the workpiece, the tool comprising an elongated body extending in the cutting direction, steps on the top surface of the body, a plurality of ridges defining shoulders on the top surface extending transversely to the cutting direction between the steps, a plurality of like bits having cutting edges, a plurality of like bit carriers having at least two elongated parallel recesses to receive the bits, the recesses extending transversely to the cutting direction and having bases to position the cutting edge of the bit above the top surface of the carriers, the bits in the recesses of each carrier being in spaced relation and the bits in one recess of a carrier being staggered in relation to the bits in the other recesses of that carrier, means to clamp detachably the bits in the recesses, and means to detachably clamp a bit carrier on each of the steps of the body whereby the bits of each bit carrier takes a single cut on the workpiece and progressively deeper cuts relative to the original surface of the workpiece are taken by the bits of successive bit carriers.

3. A broaching tool comprising an elongated body having a bottom surface, a plurality of like cutting bits, a plurality of like bit carriers detachably mounted along the body at progressive elevations above said bottom surface, each of said bit carriers having recesses to receive the bits in at least two rows extending transversely to the body, said recesses supporting the bits of each carrier at a like predetermined rake angle equal to the rake angle of the bits of the other bit carriers and with the cutting edge at a predetermined height above the bit carrier equal to the height of the cutting edge of the corresponding bit in the other bit carriers, the bits of each bit carrier positioned in spaced relation in each row of a carrier and in staggered relation to the bits in any other row of said carrier so the bits of all the rows of a single bit carrier together span the bit carrier once transversely to the body, and means detachably to clamp the bits in said recesses, whereby the bit carriers with the bits clamped therein are interchangeable and the bits of each carrier produce a single cut on a workpiece, the several bit carriers producing successive cuts of progressively greater depth relative to the original surface of the workpiece when relative cutting movement between a workpiece and the elongated body in the longitudinal direction is effected.

4. A broaching tool comprising an elongated body having a bottom surface, a plurality of like cutting bits, a plurality of like bit carriers detachably mounted along the body at progressive elevations above said bottom surface, each of said bit carriers having at least two elongated parallel bit receiving recesses extending transversely to said body and of depth equal to the corresponding recesses of the other bit carriers, said recesses of each bit carrier having a wall to support the bits therein at a like predetermined rake angle equal to the rake angle of the bits in the other bit carriers and a base to support the bits with the cutting edge at a predetermined height above the bit carrier equal to the height of the cutting edges in corresponding recesses of the other bit carriers, and means detachably to clamp the bits in spaced relation in each recess of a carrier and in staggered relation to the bits in any other recess of said carrier, whereby the bit carriers with the bits clamped therein are interchangeable and the bits of each carrier together span the bit carrier only once transversely to the body, the bits of each bit carrier producing a single flat cut on a workpiece and the several bit carriers producing successive flat cuts of progressively greater depth relative to the original surface of the workpiece when relative cutting movement between a workpiece and the elongated body in the longitudinal direction is effected.

References Cited in the file of this patent

UNITED STATES PATENTS

| | | |
|---|---|---|
| 798,856 | Wetter | Sept. 5, 1905 |
| 1,440,933 | Perkins et al. | Jan. 2, 1923 |
| 1,979,973 | Halborg | Nov. 6, 1934 |
| 2,081,639 | Perry | May 25, 1937 |
| 2,173,074 | Romaine | Sept. 12, 1939 |
| 2,392,823 | La Pointe | Jan. 15, 1946 |
| 2,538,844 | Nimz | Jan. 23, 1951 |
| 2,585,832 | Phaneuf | Feb. 12, 1952 |
| 2,645,003 | Thompson | July 14, 1953 |
| 2,656,590 | Hooper | Oct. 27, 1953 |
| 2,697,271 | Phaneuf | Dec. 21, 1954 |
| 2,730,793 | Anthony et al. | Jan. 17, 1956 |
| 2,770,027 | Bonnafe | Nov. 13, 1956 |
| 2,831,241 | Bader et al. | Apr. 22, 1958 |

FOREIGN PATENTS

| | | |
|---|---|---|
| 138,703 | Great Britain | Feb. 19, 1920 |
| 146,655 | Australia | May 30, 1952 |
| 313,138 | Germany | July 28, 1916 |